United States Patent
Itoh et al.

(10) Patent No.: US 10,300,563 B2
(45) Date of Patent: May 28, 2019

(54) ALUMINUM ALLOY BRAZING SHEET AND BRAZING METHOD

(71) Applicant: UACJ CORPORATION, Tokyo (JP)

(72) Inventors: Yasunaga Itoh, Tokyo (JP); Tomoki Yamayoshi, Tokyo (JP)

(73) Assignee: UACJ CORPORATION, Tokyo (JP)

( * ) Notice: Subject to any disclaimer, the term of this patent is extended or adjusted under 35 U.S.C. 154(b) by 0 days.

(21) Appl. No.: 15/517,700

(22) PCT Filed: Aug. 19, 2015

(86) PCT No.: PCT/JP2015/073203
§ 371 (c)(1),
(2) Date: Apr. 7, 2017

(87) PCT Pub. No.: WO2016/056306
PCT Pub. Date: Apr. 14, 2016

(65) Prior Publication Data
US 2017/0304956 A1    Oct. 26, 2017

(30) Foreign Application Priority Data
Oct. 9, 2014    (JP) .................................. 2014-207979

(51) Int. Cl.
*B23K 31/02*    (2006.01)
*B23K 35/28*    (2006.01)
(Continued)

(52) U.S. Cl.
CPC .............. *B23K 35/286* (2013.01); *B23K 1/19* (2013.01); *B23K 35/0233* (2013.01);
(Continued)

(58) Field of Classification Search
CPC .. B23K 1/0012; B23K 35/001; B23K 35/002; B23K 35/0222; B23K 35/0233;
(Continued)

(56) References Cited

U.S. PATENT DOCUMENTS 4,888,218 A * 12/1989 Suzuki .................... C23C 18/31
                                                             148/549
5,148,862 A *  9/1992 Hashiura ............... B32B 15/016
                                                             165/133
(Continued)

FOREIGN PATENT DOCUMENTS

JP          5-214475 A      8/1993
JP       2000-303132 A     10/2000
(Continued)

OTHER PUBLICATIONS

Machine translation of JP-2015-033716A (no date available).*
(Continued)

*Primary Examiner* — Kiley S Stoner
(74) *Attorney, Agent, or Firm* — Westerman, Hattori, Daniels & Adrian, LLP

(57) ABSTRACT

An aluminum alloy brazing sheet exhibits excellent brazability by effectively weakening an oxide film formed on the surface of a filler metal. The aluminum alloy brazing sheet includes a core material and a filler metal, and is used to braze aluminum in an inert gas atmosphere or in vacuum, the core material including aluminum or an aluminum alloy, the filler metal including 6 to 13 mass % of Si, with the balance being Al and unavoidable impurities, and one side or each side of the core material being clad with the filler metal, wherein the core material is clad with the filler metal in a state in which a sheet material is interposed between the core material and the filler metal, the sheet material including one element, or two or more elements, among 0.05 mass % or more of Li, 0.05 mass % or more of Be, 0.05 mass % or more of Ba, and 0.05 mass % or more of Ca, with the balance being Al and unavoidable impurities.

8 Claims, 1 Drawing Sheet

(51) Int. Cl.
| | |
|---|---|
| *B23K 1/19* | (2006.01) |
| *B23K 35/22* | (2006.01) |
| *C22C 21/00* | (2006.01) |
| *B23K 35/02* | (2006.01) |
| *C22C 21/02* | (2006.01) |
| *B32B 15/01* | (2006.01) |
| *F28F 21/08* | (2006.01) |
| *B23K 101/14* | (2006.01) |
| *B23K 103/10* | (2006.01) |
| *F28F 3/00* | (2006.01) |
| *F28F 1/02* | (2006.01) |

(52) U.S. Cl.
CPC .......... *B23K 35/0238* (2013.01); *B23K 35/22* (2013.01); *B23K 35/28* (2013.01); *B32B 15/016* (2013.01); *C22C 21/00* (2013.01); *C22C 21/02* (2013.01); *F28F 21/084* (2013.01); *F28F 21/088* (2013.01); *F28F 21/089* (2013.01); *B23K 2101/14* (2018.08); *B23K 2103/10* (2018.08); *F28F 1/02* (2013.01); *F28F 3/00* (2013.01)

(58) Field of Classification Search
CPC .. B23K 35/286; B23K 35/0238; B23K 35/38; B23K 35/22; B23K 1/19; B23K 2201/14; F28F 21/089; F28F 21/084; F28F 21/088; F28F 1/02; F28F 3/00; B32B 15/016; C22C 21/02; C22C 21/00
USPC ................. 228/245–255, 183, 262.5–262.51
See application file for complete search history.

(56) References Cited

U.S. PATENT DOCUMENTS

| | | | | |
|---|---|---|---|---|
| 6,059,174 | A * | 5/2000 | Kojima | B23K 1/0012 148/25 |
| 2002/0034653 | A1 * | 3/2002 | Okamoto | B23K 35/0238 428/654 |
| 2007/0017605 | A1 * | 1/2007 | Nakamura | C22F 1/08 148/550 |
| 2009/0162686 | A1 * | 6/2009 | Matsukado | B23K 35/0233 428/576 |
| 2009/0165901 | A1 * | 7/2009 | Koshigoe | B32B 15/016 148/535 |
| 2010/0147500 | A1 * | 6/2010 | Minami | B23K 1/0012 165/173 |
| 2010/0183897 | A1 * | 7/2010 | Kobayashi | B23K 35/0238 428/654 |
| 2011/0204124 | A1 * | 8/2011 | Wittebrood | B23K 1/0012 228/219 |
| 2011/0240280 | A1 * | 10/2011 | Izumi | B23K 1/0012 165/185 |
| 2012/0045660 | A1 * | 2/2012 | Matsukado | B23K 35/0233 428/654 |
| 2013/0260175 | A1 * | 10/2013 | Kimura | B23K 1/0004 428/654 |
| 2015/0037607 | A1 * | 2/2015 | Itoh | B23K 35/0238 428/654 |
| 2015/0118517 | A1 * | 4/2015 | Itoh | C22C 21/00 428/654 |
| 2015/0203934 | A1 * | 7/2015 | Oskarsson | B23K 35/0233 165/134.1 |
| 2015/0321293 | A9 * | 11/2015 | Itoh | C22C 21/00 428/654 |
| 2016/0031045 | A1 * | 2/2016 | Izumi | C22C 21/00 403/272 |
| 2017/0045316 | A1 * | 2/2017 | Terayama | B23K 20/04 |

FOREIGN PATENT DOCUMENTS

| | | | |
|---|---|---|---|
| JP | 2004-358519 A | 12/2004 | |
| JP | 2013-1941 A | 1/2013 | |
| JP | 2013-233552 A | 11/2013 | |
| JP | 2014-176892 A | 9/2014 | |
| JP | 2015-33716 A | 2/2015 | |
| WO | WO-2013168669 A1 * | 11/2013 | ............. C22C 21/00 |
| WO | 2014/097820 A1 | 6/2014 | |

OTHER PUBLICATIONS

Machine translation of JP-2000-303132A (no date available).*
International Search Report dated Nov. 17, 2015, issued in counterpart of International Application No. PCT/JP2015/073203 (2 pages).

* cited by examiner

ALUMINUM ALLOY BRAZING SHEET AND BRAZING METHOD

TECHNICAL FIELD

The present invention relates to an aluminum alloy brazing sheet that is used to braze aluminum in an inert gas atmosphere or in vacuum, and a brazing method that utilizes the aluminum alloy brazing sheet.

BACKGROUND ART

A brazing method has been widely used as a method for producing an aluminum product (e.g., aluminum heat exchanger or machine part) having a large number of small joints. When brazing aluminum (including an aluminum alloy), it is indispensable to break the oxide film that covers the surface of the material so that the molten filler metal comes in contact with the matrix or another molten filler metal. The oxide film can be broken by utilizing a method that utilizes a flux, or a vacuum heating method, for example. These methods have been put to practical use.

The brazing method is applied to various fields. The brazing method is most typically applied to automotive heat exchangers. Most of the automotive heat exchangers (e.g., radiator, heater, condenser, and evaporator) are made of aluminum, and produced by applying the brazing method. A method that applies a non-corrosive flux to the material, followed by heating in a nitrogen gas atmosphere is most widely used at present.

In recent years, a heat exchanger provided with electronic parts (e.g., inverter cooler) has been used along with a change in driveline (e.g., electric car and hybrid car), and a flux residue has increasingly posed problems. Therefore, some of the inverter coolers are produced using a vacuum brazing method that does not utilize flux. However, since the vacuum brazing method utilizes a heating furnace that increases the equipment cost and the maintenance cost, and has problems as to productivity and brazing stability, a brazing method that is implemented in a nitrogen gas furnace without using flux has been increasingly desired.

In order to deal with the above demands, the inventors proposed a clad material that is used to effect brazing in an inert gas atmosphere without using a flux, and is produced by heating a core material and a filler metal in a state in which a metal powder is interposed between the core material and the filler metal, to a temperature equal to or higher than the solidus temperature of the metal powder to produce a liquid phase in the metal powder and bond the core material and the filler metal, and subjecting the core material and the filler metal to hot clad rolling, the metal powder including at least one of Li, Be, Ba, Ca, and the like, and having a solidus temperature lower than the solidus temperature of the core material and the solidus temperature of the filler metal.

When the above clad material is used, an oxide is not formed on the surface of the filler metal during material production, differing from a case where Li, Be, Ba, Ca, and the like are added to the filler metal. Since Li, Be, Ba, Ca, and the like are dissolved and diffused in the molten filler metal during brazing, and the oxide film formed on the surface of the molten filler metal is weakened, brazability can be effectively improved.

However, the method that supplies Li, Be, Ba, Ca, and the like to the filler metal using a metal powder has the following problems in terms of material production. Specifically, when a clad material is produced in a plant, it is necessary to provide a large amount of metal powder between the core material and the filler metal since the filler metal that has not been rolled has a considerable thickness. When Li, Be, Ba, Ca, and the like are added in an increased amount, a strong oxide film is formed on the surface of the metal powder. Since the oxide film does not break even when heated to a temperature equal to or higher than the solidus temperature of the metal powder, it is difficult to uniformly bond the core material and the filler metal. If the metal powder remains at the boundary between the core material and the filler metal in the form of a powder, the cladding capability during hot rolling is affected, whereby peeling may occur during rolling, or blistering may occur during softening (heating). Since a large amount of a metal powder that has a strong oxidizing capability is used, it is necessary to take special safety measures in the production site. It is also necessary to strictly prevent the metal powder from being mixed with another material. Therefore, it is difficult to produce a product having stable quality, and an increase in cost occurs.

A method that implements brazing in an inert gas atmosphere without using a flux by diffusing Mg into the filler metal during brazing has been proposed. For example, a method that diffuses Mg added to the core material into the filler metal, and a method that diffuses Mg added to a sacrificial anode material provided between the core material and the filler metal into the filler metal, are known. These methods may prevent a situation in which an oxide film is formed on the surface of the filler metal during production of the clad material or during brazing, and it may be considered that Mg is effective for breaking the oxide film formed on the surface of the filler metal.

However, the functions of the core material and the sacrificial anode material included in the clad material may be impaired by the addition of Mg. Specifically, when the Mg content is increased, erosion may occur to a large extent due to molten filler metal, or corrosion resistance may be adversely affected. On the other hand, when the Mg content is limited, it may be difficult to sufficiently break the oxide film formed on the surface of the filler metal. When Li, Be, Ba, and Ca are added to the core material or the sacrificial anode material, it is difficult to break the oxide film since the amount of addition is further limited.

CITATION LIST

Patent Literature

Patent Literature 1: JP-A-2004-358519
Patent Literature 2: JP-A-2013-001941

SUMMARY OF INVENTION

Technical Problem

The invention was conceived in order to solve the above problems. An object of the invention is to provide an aluminum alloy brazing sheet that exhibits excellent brazability by ensuring that Li, Be, Ba, or Ca is promptly diffused into the filler metal during brazing, and dissolved in the molten filler metal so that the oxide film formed on the surface of the filler metal is effectively weakened, and a brazing method that utilizes the aluminum alloy brazing sheet.

Solution to Problem

According to a first aspect of the invention, an aluminum alloy brazing sheet includes a core material and a filler metal, and is used to braze aluminum in an inert gas atmosphere or in vacuum, the core material including aluminum or an aluminum alloy, the filler metal including 6 to 13% of Si, with the balance being Al and unavoidable impurities, and one side or each side of the core material being clad with the filler metal, wherein the core material is clad with the filler metal in a state in which a sheet material is interposed between the core material and the filler metal, the sheet material including one element, or two or more elements, among 0.05% or more of Li, 0.05% or more of Be, 0.05% or more of Ba, and 0.05% or more of Ca, with the balance being Al and unavoidable impurities. Note that the unit "%" used in connection with the content of each alloy component refers to "mass %".

According to a second aspect of the invention, an aluminum alloy brazing sheet includes a core material and a filler metal, and is used to braze aluminum in an inert gas atmosphere or in vacuum, the core material including aluminum or an aluminum alloy, the filler metal including 6 to 13 mass % of Si, with the balance being Al and unavoidable impurities, and one side or each side of the core material being clad with the filler metal, wherein the core material is clad with the filler metal in a state in which a sheet material and a sacrificial anode material are interposed between the core material and the filler metal so that the core material, the sacrificial anode material, the sheet material, and the filler metal are situated in this order, the sheet material including one element, or two or more elements, among 0.05% or more of Li, 0.05% or more of Be, 0.05% or more of Ba, and 0.05% or more of Ca, with the balance being Al and unavoidable impurities, and the sacrificial anode material including 0.9 to 6% of Zn, with the balance being Al and unavoidable impurities.

According to a third aspect of the invention, an aluminum alloy brazing sheet includes a core material, a filler metal, and a sacrificial anode material, and is used to braze aluminum in an inert gas atmosphere or in vacuum, the core material including aluminum or an aluminum alloy, the filler metal including 6 to 13 mass % of Si, with the balance being Al and unavoidable impurities, the sacrificial anode material including 0.9 to 6% of Zn, with the balance being Al and unavoidable impurities, one side of the core material being clad with the filler metal, and the other side of the core material being clad with the sacrificial anode material, wherein the core material is clad with the filler metal in a state in which a sheet material is interposed between the core material and the filler metal, the sheet material including one element, or two or more elements, among 0.05% or more of Li, 0.05% or more of Be, 0.05% or more of Ba, and 0.05% or more of Ca, with the balance being Al and unavoidable impurities.

In the above aluminum alloy brazing sheet, the sheet material may further include 0.4 to 4.0% of Mg.

In the above aluminum alloy brazing sheet, the sheet material may further include 2 to 13% of Si.

In the above aluminum alloy brazing sheet, the filler metal may further include 0.004 to 0.2% of Bi.

In the above aluminum alloy brazing sheet, the core material that includes the aluminum alloy may include one element, or two or more elements, among 1.8% or less of Mn, 1.2% or less of Si, 1.0% or less of Fe, 1.5% or less of Cu, 0.8% or less of Zn, 0.2% or less of Ti, and 0.5% or less of Zr, with the balance being Al and unavoidable impurities.

In the above aluminum alloy brazing sheet, the core material that includes the aluminum alloy may further include 0.4 to 1.3% of Mg.

According to a fourth aspect of the invention, a brazing method includes effecting brazing in an inert gas atmosphere or in vacuum using the above aluminum alloy brazing sheet without applying a flux.

According to a fifth aspect of the invention, a brazing method includes effecting brazing in an inert gas atmosphere using the above aluminum alloy brazing sheet in a state in which a fluoride-based flux is applied to the entirety or part of a brazing area in an amount of 1 to 20 $g/m^2$.

Advantageous Effects of Invention

Since Li, Be, Ba, Ca, and Mg that may be included to the sheet material have a low oxide formation free energy, these elements are diffused into the filler metal during brazing (heating), and form an oxide within the aluminum oxide film that covers the surface of the filler metal. The oxide induces breakage of the aluminum oxide film. Li, Be, Ba, and Ca are effective independently of the heating temperature during brazing when added to the sheet material. On the other hand, Mg is particularly effective when the heating temperature during brazing is high.

When the above elements are added directly to the filler metal, an oxide is also formed during production of the brazing sheet, whereby the elements are unnecessarily consumed. Moreover, since a stronger surface oxide film is formed, it is necessary to remove the oxide film by performing an etching treatment before brazing. On the other hand, when the above elements are supplied to the filler metal through the sheet material or the core material, the above elements do not form an oxide during production of the brazing sheet, and are diffused from the sheet material or the core material into the filler metal during brazing. Since brazing is effected in an inert gas atmosphere having a low oxygen concentration, strong oxidation that strengthen the oxide film does not occur even when trace elements (i.e., Li, Be, Ba, and Ca) included in the sheet material have reached the surface of the filler metal during brazing. Since the oxide formed by these elements serves as a start point at which the oxide film is divided after the filler metal has been melted, the oxide film weakens. Moreover, the above elements are dissolved in the filler metal at a time when the filler metal have been melted. Since the elements are promptly diffused into the molten filler metal as compared with a solid filler metal, the elements promptly form an oxide on the surface of the filler metal to promote breakage of the oxide film.

When Mg is added to the sheet material, the Mg content in the sheet material must be 0.4% or more (i.e., the Mg content in the sheet material must be set to be higher than the content of Li, Be, Ba, and Ca). Therefore, when the sheet material to which Mg is added is slowly heated, Mg may be diffused to reach the surface of the filler metal, and form an oxide to a large extent, whereby the oxide film formed on the surface of the filler metal may become strong. Note that the addition of Mg to the sheet material is effective when the heating rate is high.

When the heating rate is considerably high, the oxide film formed on the surface of the filler metal is not sufficiently broken due to diffusion of Li, Be, Ba, and Ca included in the sheet material, but is mainly broken after the filler metal has been melted. In order to ensure that the oxide film is promptly broken after the filler metal has been melted, it is effective to add Si to the sheet material so that the sheet material is melted at the same time as the filler metal. When Mg is added to the sheet material, it is particularly effective to add Si to the sheet material when the heating rate is higher.

According to the invention that adds an element that breaks an oxide film to the sheet material, since the element is diffused into the filler metal at a high concentration, and a large amount of the element is supplied to the filler metal when the filler metal has been melted, as compared with the case where the element is added to the core material or the sacrificial anode material, and diffused into the filler metal, an oxide that is effective for breaking the oxide film is intensively formed. Since breakage of the aluminum oxide film is efficiently and strongly induced by the intensive formation of the oxide immediately before brazing, brazability is remarkably improved, and stable brazability can be obtained without performing an etching treatment before brazing.

When brazing is effected in an inert gas atmosphere without using a flux, it is necessary to take account of the oxygen concentration and the water content (dew point) in the atmosphere. For example, when the oxygen concentration in the atmosphere is high, it may be difficult to effect brazing without using a flux. When the brazing sheet according to the invention is used, it is possible to effect brazing in a stable manner without using a flux when the oxygen concentration in the nitrogen gas atmosphere is 20 ppm or less. However, when a product having a hollow structure is produced by brazing, and the oxygen concentration in the atmosphere exceeds 20 ppm, the inner side can be sufficiently brazed without using a flux due to the effect of Li, Be, Ba, Ca, or Mg, but the outer side may not be sufficiently brazed. This is because the surface of the filler metal may be reoxidized during brazing. Therefore, it is preferable to use a method that effects brazing in a state in which a flux is applied to the brazing area when subjecting the outer side to brazing in order to improve brazability. According to the invention, brazability is improved by the flux that has been melted and activated immediately before the filler metal is melted with respect to the outer side that is affected by reoxidation, so that a good brazed joint can be obtained. Moreover, since Li, Be, Ba, Ca, or Mg effectively weakens the oxide film, it is possible to reduce the amount of flux to be applied as compared with a known brazing sheet. Specifically, it is possible to significantly reduce the amount of flux to be used as compared with a method that is mainly used at present and effects brazing in a state in which a flux is applied to the entire surface of the brazing target (CAB method or Nocolok brazing method), and prevent a situation in which clogging occurs due to a flux when producing a heat exchanger that has a small refrigerant passage. According to the invention, a joint that is difficult to braze, can also be reliably brazed by applying a flux.

A fluoride flux that basically includes KF and $AlF_3$ is mainly used as the flux. Since such a flux reacts with Mg, and deteriorates in function, it is normally undesirable to use application of the flux and the addition of Mg of the material in combination. Note that a small amount of Mg may be added to the material to such an extent that the function of the flux does not deteriorate to a large extent. When Mg is added to the filler metal, the Mg content in the filler metal is set to be less than 0.1%. When Mg is added to the sheet material or the core material, the Mg content in the sheet material or the core material is set to be less than 0.2%. A brazing method that uses a Cs-based flux or a Cs mixture-based flux has an advantage in that the function of the flux does not deteriorate to a large extent, but has a disadvantage in that an increase in cost and deterioration in stability occur as compared with the method according to the invention.

The invention also has the following advantage. Specifically, since the filler metal and the core material used for the brazing sheet according to the invention can be produced using a common material that can be produced or is available all over the world, the brazing sheet according to the invention can be produced in plants situated all over the world as long as the plants can produce an ordinary aluminum clad material. A material obtained by cutting a sheet coil or ingot slab rolled or obtained inside or outside the country may be used as the sheet material that is produced using a special material. Since the sheet material accounts for only several percent (substantially about 1%) of the brazing sheet, an increase in cost due to shipping expenses and tariffs is small even when a sheet coil or ingot slab is imported.

The above degree of freedom is also effective for production of a product (e.g., heat exchanger) in addition to material production. Specifically, when producing a heat exchanger, an acid or an alkali is used for an etching treatment that is performed before brazing. However, since it takes time to manage and dispose of such a liquid, heat exchanger manufacturers and the like tend to desire to avoid such an etching treatment (i.e., it is difficult to entrust an etching treatment to overseas manufacturers). The invention can also solve this problem.

DESCRIPTION OF EMBODIMENTS

Figure 1:
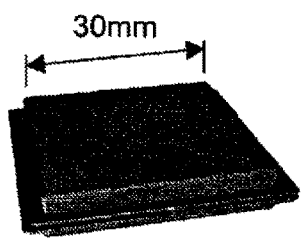
FIG. 1 is an external view illustrating a cup specimen that is used to evaluate brazability (see the examples).

An aluminum alloy brazing sheet according to a first embodiment of the invention includes a core material and a filler metal, and is used to braze aluminum in an inert gas atmosphere or in vacuum, the core material including aluminum or an aluminum alloy, the filler metal including 6 to 13% of Si, with the balance being Al and unavoidable impurities, and one side or each side of the core material being clad with the filler metal, wherein the core material is clad with the filler metal in a state in which a sheet material is interposed between the core material and the filler metal, the sheet material including one element, or two or more elements, among 0.05% or more of Li, 0.05% or more of Be, 0.05% or more of Ba, and 0.05% or more of Ca, with the balance being Al and unavoidable impurities. The filler metal with which the core material is clad has an Si content of 6 to 13%. If the Si content in the filler metal is less than 6%, brazability may deteriorate. If the Si content in the filler metal exceeds 13%, cracks may easily occur during material production, and it may be difficult to produce a brazing sheet.

Li, Be, Ba, and Ca that may be included in the sheet material that is interposed between the core material and the filler metal are diffused or dissolved in the filler metal during brazing (heating), and form an oxide within the aluminum oxide film that covers the surface of the filler metal. The oxide induces breakage of the aluminum oxide film, and significantly improves brazability. The sheet material has a function of supplying these elements to the filler metal.

If the content of Li, Be, Ba, and Ca in the sheet material is less than 0.05%, respectively, these elements may not be sufficiently diffused or dissolved in the filler metal, and may not induce breakage of the oxide film formed on the surface of the filler metal. The upper limit of the content of Li, Be, Ba, and Ca in the sheet material is preferably 1.5%. If the content of Li, Be, Ba, and Ca in the sheet material exceeds 1.5%, cracks may occur when the sheet material is produced by casting and rolling.

The sheet material may be produced by casting an alloy that includes one element, or two or more elements, among 0.05% or more of Li, 0.05% or more of Be, 0.05% or more of Ba, and 0.05% or more of Ca, with the balance being Al and unavoidable impurities, and cutting the resulting ingot in the shape of a sheet. A rolled sheet (hot-rolled sheet or cold-rolled sheet) obtained by rolling the ingot may also be used as the sheet material.

An aluminum alloy brazing sheet according to a second embodiment of the invention is characterized in that the core material is clad with the filler metal in a state in which a sheet material and a sacrificial anode material are interposed between the core material and the filler metal so that the core material, the sacrificial anode material, the sheet material, and the filler metal are situated in this order, the sheet material including one element, or two or more elements, among 0.05% or more of Li, 0.05% or more of Be, 0.05% or more of Ba, and 0.05% or more of Ca, with the balance being Al and unavoidable impurities, and the sacrificial anode material including 0.9 to 6% of Zn, with the balance being Al and unavoidable impurities. When brazing is effected using the aluminum alloy brazing sheet according to the second embodiment of the invention, the resulting heat exchanger, machine part, and the like exhibit corrosion resistance due to the sacrificial anode material.

The Zn content in the sacrificial anode material is 0.9 to 6%. If the Zn content in the sacrificial anode material is less than 0.9%, a sufficient anticorrosive effect may not be obtained. If the Zn content in the sacrificial anode material exceeds 6%, corrosion may be promoted, and the corrosion perforation life may decrease.

An aluminum alloy brazing sheet according to a third embodiment of the invention includes a core material, a filler metal, and a sacrificial anode material, and is used to braze aluminum in an inert gas atmosphere or in vacuum, the core material including aluminum or an aluminum alloy, the filler metal including 6 to 13 mass % of Si, with the balance being Al and unavoidable impurities, the sacrificial anode material including 0.9 to 6% of Zn, with the balance being Al and unavoidable impurities, one side of the core material being clad with the filler metal, and the other side of the core material being clad with the sacrificial anode material, wherein the core material is clad with the filler metal in a state in which a sheet material is interposed between the core material and the filler metal, the sheet material including one element, or two or more elements, among 0.05% or more of Li, 0.05% or more of Be, 0.05% or more of Ba, and 0.05% or more of Ca, with the balance being Al and unavoidable impurities. The sacrificial anode material provides an anticorrosive effect.

When the sheet material further includes 0.4 to 4.0% of Mg, it is possible to promote breakage of the oxide film particularly when the heating rate during brazing is high. If the Mg content in the sheet material is less than 0.4%, the effect of breaking the oxide film formed on the surface of the filler metal may be insufficient. If the Mg content in the sheet material exceeds 4.0%, joinability during clad rolling may deteriorate, and it may be difficult to produce a brazing sheet. Moreover, when the brazing sheet is used in combination with a flux, Mg that that has been diffused from the sheet material into the surface of the filler metal may react with the flux, and the function of the flux may deteriorate.

When the sheet material further includes 2 to 13% of Si, it is possible to promote breakage of the oxide film particularly when the heating rate during brazing is high. If the Si content in the sheet material is less than 2%, the effect of breaking the oxide film formed on the surface of the filler metal may be insufficient. If the Si content in the sheet material exceeds 13%, crack may easily occur during rolling, and it may be difficult to produce a brazing sheet.

The filler metal may further include either or both of 0.004 to 0.2% of Bi. If the Bi content in the filler metal is less than 0.004%, the effect of improving brazability may be insufficient. If the Bi content in the filler metal exceeds 0.2%, Bi may form a specific oxide, whereby the fluidity or the fillet-forming capability of the molten filler metal may become non-uniform.

It is preferable that the core material include pure aluminum, or include an aluminum alloy that includes one element, or two or more elements, among 1.8% or less of Mn, 1.2% or less of Si, 1.0% or less of Fe, 1.5% or less of Cu, 0.8% or less of Zn, 0.2% or less of Ti, and 0.5% or less of Zr, with the balance being Al and unavoidable impurities, or include the aluminum alloy that further includes 0.4 to 1.3% of Mg.

Mn that may be included in the core material (aluminum alloy) is effective for improving the strength of the core material, and adjusting the potential of the core material. If the Mn content in the core material exceeds 1.8%, cracks may easily occur when rolling the material. The lower limit of the Mn content in the core material is preferably 0.3% from the viewpoint of an improvement in the strength of the core material. Si is effective for improving the strength of the core material. If the Si content in the core material exceeds 1.2%, local melting may occur during brazing due to a decrease in melting point, whereby the core material may be deformed, and may exhibit decreased corrosion resistance. The lower limit of the Si content in the core material is preferably 0.3%.

Fe is effective for improving the strength of the core material. If the Fe content in the core material exceeds 1.0%, the corrosion resistance of the core material may deteriorate, and coarse precipitates may be produced. The lower limit of the Fe content in the core material is preferably 0.2% from the viewpoint of an improvement in the strength of the core material. Cu is effective for improving the strength of the core material, and adjusting the potential of the core material. If the Cu content in the core material exceeds 1.5%, intergranular corrosion may easily occur, and the melting point of the core material may decrease. The lower limit of the Cu content in the core material is preferably 0.2% from the viewpoint of an improvement in the strength of the core material.

Zn is effective for adjusting the potential of the core material. If the Zn content exceeds 0.8%, the natural electrode potential may decrease, and the corrosion perforation life may decrease. The lower limit of the Zn content in the core material is preferably 0.1%. Ti is effective for causing corrosion to proceed in layers. If the Ti content in the core material exceeds 0.2%, coarse precipitates may be easily produced, and rollability and corrosion resistance may deteriorate. The lower limit of the Ti content in the core material is preferably 0.06%. Zr is effective for increasing the crystal grain size of the core material. If the Zr content in the core material exceeds 0.5%, cracks may easily occur during material production. The lower limit of the Zr content in the core material is preferably 0.2%.

When the core material (aluminum alloy) includes Mg, it is possible to improve the strength of the brazing sheet, and promote breakage of the oxide film formed on the filler metal. If the Mg content in the core material is less than 0.4%, the strength of the brazing sheet may not be sufficiently improved, and it may be difficult to sufficiently weaken the oxide film formed on the filler metal when brazing is effected in an inert gas atmosphere or in vacuum without using a flux. If the Mg content in the core material exceeds 1.3%, the melting point of the core material may decrease, and local melting may occur during brazing, whereby the core material may be deformed, and eroded due to the molten filler metal. As a result, brazability and corrosion resistance may deteriorate.

A brazing method according to one embodiment of the invention that utilizes an aluminum alloy brazing sheet includes effecting brazing in an inert gas atmosphere or in vacuum using the above aluminum alloy brazing sheet without applying a flux, to produce a heat exchanger, a machine part, or the like.

A brazing method according to another embodiment of the invention that utilizes an aluminum alloy brazing sheet includes effecting brazing in an inert gas atmosphere using the above aluminum alloy brazing sheet in a state in which a fluoride-based flux is applied to the entirety or part of a brazing area in an amount of 1 to 20 g/m$^2$, to produce a heat exchanger, a machine part, or the like.

When producing a heat exchanger, a machine part, or the like using the brazing method that utilizes a flux, it is preferable to apply the fluoride-based flux to a brazing area that is difficult to braze in an amount of 1 to 20 g/m$^2$. If the fluoride-based flux is applied in an amount of less than 1 g/m$^2$, a sufficient effect may not be obtained. If the fluoride-based flux is applied in an amount of more than 20 g/m$^2$, the amount of flux residue may increase, and the outward appearance of the resulting product may be impaired.

EXAMPLES

The invention is further described below by way of examples and comparative examples to demonstrate the advantageous effects of the invention. Note that the following examples are for illustration purposes only, and the invention is not limited to the following examples.

Example 1

Aluminum alloys (i.e., an aluminum alloy for producing a filler metal, an aluminum alloy for producing a core material, an aluminum alloy for producing a sheet material, and an aluminum alloy for producing a sacrificial anode material) respectively having the composition listed in Table 1 were subjected to continuous casting to obtain ingots. The ingot for producing a core material was ground to have a length of 163 mm, a width of 163 mm, and a thickness of 27 mm. The ingot for producing a filler metal was hot-rolled to have a thickness of 3 mm, and cut to have a length of 163 mm and a width of 163 mm.

The ingot for producing a sheet material was hot-rolled to have a thickness of 3 mm, cold-rolled to have a thickness of 0.25 to 2 mm, and cut to have a length of 163 mm and a width of 163 mm. The ingot that was merely cut was also used as the sheet material. The ingot for producing a sacrificial anode material was hot-rolled to have a thickness of 3 mm, cold-rolled to have a thickness of 1.5 mm, and cut to have a length of 163 mm and a width of 163 mm.

The resulting filler metal, core material, sheet material, and sacrificial anode material were subjected to clad rolling according to an ordinary method to obtain a soft clad sheet material having a thickness of 0.4 mm. The soft clad sheet material was used as a specimen.

Figure 2:
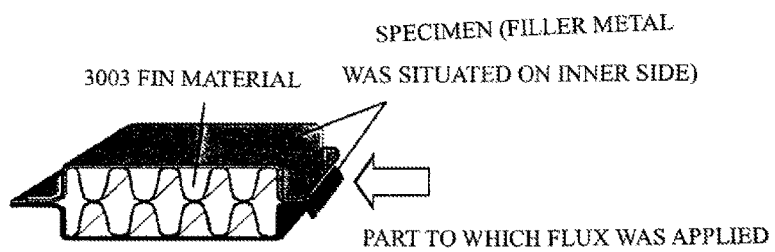
FIG. 2 is a cross-sectional view illustrating a cup specimen.

The specimen was pressed in the shape of a cup, degreased using acetone ("Unetched" in Table 1), or degreased using acetone, and etched using a weak acid ("Etched" in Table 1), and a cup specimen illustrated in FIGS. 1 and 2 was prepared using the specimen. A fin obtained by forming and degreasing a 3003 alloy sheet material having a thickness of 0.1 mm was provided inside the cup specimen, and brazing was effected without using a flux. Brazing was effected in a nitrogen gas furnace, or in vacuum.

The nitrogen gas furnace was a two-chamber experimental furnace including a front chamber and a rear chamber. When the temperature of the specimen heated in the front chamber reached 450° C., the specimen was transferred to the rear chamber, and heated. When the temperature of the specimen reached 600° C., the specimen was transferred to the front chamber, and cooled to 570° C. The specimen was then removed from the furnace, and air-cooled. The heating rate during brazing was adjusted by changing the temperature inside the rear chamber. The heating time from 450° C. to 600° C. was set to 12 minutes, 6 minutes, or 3 minutes. The oxygen concentration during brazing was 15 to 20 ppm.

The vacuum furnace was a batch-type (single-chamber) experimental furnace. The temperature of the furnace was adjusted so that the heating time from 450° C. to 600° C. was set to 12 minutes. The pressure inside the furnace during brazing was 5 to 8×10$^{-3}$ Pa. Heating was stopped when the temperature of the specimen reached 600° C. After cooling the specimen to 500° C. inside the furnace, the pressure inside the furnace was returned to atmospheric pressure by injecting nitrogen gas, and the specimen was removed from the furnace, and air-cooled.

The brazed state of the cup specimen was evaluated as described below. A fillet formed on the outer side of the flare joint was observed with the naked eye. A case where a sound fillet was formed was evaluated as "A", a case where the fillet did not break, but was unstable to some extent, or the fillet had a uniform shape, but was small, was evaluated as "B", a case where the fillet broke was evaluated as "C", and a case where a fillet was not formed, or the size of the fillet was too small to observe, was evaluated as "D". The brazed state was determined to be acceptable when evaluated as "A" or "B". The brazed specimen was divided into two pieces, and the fillet formation state on the inner side of the flare joint and the joint of the fin, and evaluated in the same manner as described above.

The evaluation results are shown in Table 1. As shown in Table 1, the cup specimens prepared using Specimens 1 to 21 according to the invention had an excellent (acceptable) brazed state even when the etching treatment was not performed. Note that the cup specimen prepared using Specimen 14 that was prepared using a sheet material (length: 163 mm, width: 163 mm, thickness: 5 mm) obtained by cutting the ingot, also had an excellent brazed state.

The cup specimen prepared using Specimen 17 that was heated from 450° C. to 600° C. within 6 minutes, and included the sheet material including Si, had a brazed state better than that of the cup specimen prepared using Specimen 3 that was also heated from 450° C. to 600° C. within 6 minutes, but included the sheet material that did not include Si, since the supply of Li to the surface of the filler metal was promoted due to Si. The cup specimen prepared using Specimen 18 that was heated from 450° C. to 600° C. within 3 minutes, and included the sheet material including both Si and Mg, had a brazed state better than that of the cup specimen prepared using Specimen 19 that was also heated from 450° C. to 600° C. within 3 minutes.

TABLE 1

| Specimen | Clad Configuration | Si | Fe | Cu | Mn | Mg | Cr | Zn | Ti | Zr | Li | Be | Ba | Ca | Bi | Thickness (mm) | Cladding Ratio (%) | Heating Time (450→600° C.) (min) | Atmosphere | Brazability Unetched | Brazability Etched |
|---|---|---|---|---|---|---|---|---|---|---|---|---|---|---|---|---|---|---|---|---|---|
| 1 | Filler metal | 6 | — | — | — | — | — | — | — | — | 0.3 | — | — | — | — | 0.4 | 9.9 | 12 | Nitrogen | Outer side: B / Inner side: B | Outer side: B / Inner side: B |
|   | Sheet material / Core material | — | — | — | 1.2 | — | — | — | — | — | — | — | — | — | — |   | 0.8 |   |   |   |   |
| 2 | Filler metal | 13 | — | — | — | — | — | — | — | — | 0.08 | — | — | — | — | 0.4 | 9.8 | 12 | Nitrogen | Outer side: B / Inner side: B | Outer side: B / Inner side: B |
|   | Sheet material / Core material | — | — | — | 1.2 | — | — | — | — | — | — | — | — | — | — |   | 1.6 |   |   |   |   |
| 3 | Filler metal | 12 | — | — | — | — | — | — | — | — | — | — | — | — | — | 0.4 | 9.6 | 6 | Nitrogen | Outer side: B / Inner side: B | Outer side: B / Inner side: B |
|   | Sheet material / Core material | — | — | — | 1.2 | — | — | — | — | — | — | — | — | — | — |   | 3.8 |   |   |   |   |
| 4 | Filler metal | 10 | — | — | — | — | — | — | — | — | 0.2 | 0.09 | — | — | 0.05 | 0.4 | 9.9 | 12 | Nitrogen | Outer side: B / Inner side: A | Outer side: A / Inner side: A |
|   | Sheet material / Core material | — | — | — | 1.2 | — | — | — | — | — | — | — | — | — | — |   | 0.6 |   |   |   |   |
| 5 | Filler metal | 12 | — | — | — | — | — | — | — | — | 0.6 | 0.05 | — | — | — | 0.4 | 9.4 | 12 | Nitrogen | Outer side: B / Inner side: A | Outer side: A / Inner side: A |
|   | Sheet material / Core material | — | — | — | 1.2 | — | — | — | — | — | — | — | — | — | — |   | 6.3 |   |   |   |   |
| 6 | Filler metal | 10 | — | — | — | — | — | — | — | — | — | 0.08 | 0.15 | — | 0.05 | 0.4 | 9.8 | 12 | Nitrogen | Outer side: B / Inner side: A | Outer side: A / Inner side: A |
|   | Sheet material / Core material | — | — | — | 1.2 | — | — | — | — | — | — | — | — | — | — |   | 1.6 |   |   |   |   |
| 7 | Filler metal | 10 | — | — | — | — | — | — | — | — | — | 0.08 | 0.15 | — | — | 0.4 | 9.8 | 12 | Vacuum | Outer side: B / Inner side: A | Outer side: A / Inner side: A |
|   | Sheet material / Core material | — | — | — | 1.2 | — | — | — | — | — | — | — | — | — | — |   | 1.6 |   |   |   |   |
| 8 | Filler metal | 12 | — | — | — | — | — | — | — | — | — | — | 0.1 | 0.07 | 0.05 | 0.4 | 9.7 | 12 | Nitrogen | Outer side: B / Inner side: B | Outer side: B / Inner side: B |
|   | Sheet material / Core material | — | — | — | 1.2 | — | — | — | — | — | — | — | — | — | — |   | 3.2 |   |   |   |   |
| 9 | Filler metal | 12 | — | — | — | — | — | — | — | — | 0.1 | — | — | 0.07 | 0.05 | 0.4 | 9.4 | 12 | Nitrogen | Outer side: B / Inner side: A | Outer side: A / Inner side: A |
|   | Sheet material / Core material | — | — | — | 1.2 | — | — | — | — | — | — | — | — | — | — |   | 6.3 |   |   |   |   |
| 10 | Filler metal | 10 | — | — | — | — | — | — | — | — | 0.2 | 0.06 | 0.1 | — | — | 0.4 | 9.9 | 12 | Nitrogen | Outer side: B / Inner side: A | Outer side: A / Inner side: A |
|    | Sheet material / Core material | — | — | — | 1.2 | — | — | — | — | — | — | — | — | — | — |   | 1.3 |   |   |   |   |
| 11 | Filler metal | 10 | — | — | — | — | — | — | — | — | 0.1 | — | — | — | 0.2 | 0.4 | 9.8 | 12 | Nitrogen | Outer side: B / Inner side: A | Outer side: A / Inner side: A |
|    | Sheet material / Core material | — | — | — | 1.2 | — | — | — | — | — | — | — | — | — | — |   | 1.6 |   |   |   |   |
|    | Sacrificial anode material | — | — | — | — | — | — | 2.5 | — | — | — | — | — | — | — |   | 4.6 |   |   |   |   |
| 12 | Filler metal | 12 | — | — | — | — | — | — | — | — | 0.1 | — | — | — | 0.05 | 0.4 | 9.2 | 12 | Nitrogen | Outer side: A / Inner side: A | Outer side: A / Inner side: A |
|    | Sheet material / Core material | — | — | — | 1.2 | — | — | — | — | — | — | — | — | — | — |   | 3.1 |   |   |   |   |
|    | Sacrificial anode material | — | — | — | — | — | — | 2.5 | — | — | — | — | — | — | — |   | 4.6 |   |   |   |   |
| 13 | Filler metal | 12 | — | — | — | — | — | — | — | — | 0.1 | — | — | — | — | 0.4 | — | 12 | Nitrogen | Outer side: B / Inner side: A | Outer side: A / Inner side: A |
|    | Sheet material / Core material | — | — | — | 1.2 | — | — | — | — | — | — | — | — | — | — |   | — |   |   |   |   |

TABLE 1-continued

| | | Composition (mass %) | | | | | | | | | | | | | | Thickness | Cladding | Heating Time | | Brazability of cup specimen | |
|---|---|---|---|---|---|---|---|---|---|---|---|---|---|---|---|---|---|---|---|---|---|
| | Clad | | | | | | | | | | | | | | | | | (450→600° | | | |
| Specimen | Configuration | Si | Fe | Cu | Mn | Mg | Cr | Zn | Ti | Zr | Li | Be | Ba | Ca | Bi | (mm) | Ratio (%) | C.) (min) | Atmosphere | Unetched | Etched |
| 14 | Filler metal | 12 | — | — | — | — | — | — | — | — | — | — | — | — | — | 0.4 | 8.8 | 12 | Nitrogen | Outer side: B | Outer side: A |
| | Sheet material | — | — | — | — | 0.4 | — | — | — | — | — | 0.05 | — | — | — | | 11.8 | | | Inner side: A | Inner side: A |
| | Core material | — | — | — | 1.2 | — | — | — | — | — | — | — | — | — | — | | — | | | | |
| 15 | Filler metal | 10 | — | — | — | — | — | — | — | — | — | — | — | — | — | 0.4 | 9.9 | 12 | Nitrogen | Outer side: B | Outer side: A |
| | Sheet material | — | — | — | — | 4 | — | — | — | — | — | — | — | — | — | | 0.8 | | | Inner side: A | Inner side: A |
| | Core material | — | — | — | 1.2 | — | — | — | — | — | — | — | — | — | — | | — | | | | |
| 16 | Filler metal | 10 | — | — | — | — | — | — | — | — | 0.05 | — | — | — | — | 0.4 | 9.9 | 12 | Vacuum | Outer side: B | Outer side: A |
| | Sheet material | — | — | — | — | 4 | — | — | — | — | — | — | — | — | — | | 0.8 | | | Inner side: A | Inner side: A |
| | Core material | — | — | — | 1.2 | — | — | — | — | — | — | — | — | — | — | | — | | | | |
| 17 | Filler metal | 12 | — | — | — | — | — | — | — | — | 0.2 | — | — | — | 0.05 | 0.4 | 9.7 | 6 | Nitrogen | Outer side: B | Outer side: A |
| | Sheet material | 2 | — | — | — | — | — | — | — | — | — | — | — | — | — | | 3.7 | | | Inner side: A | Inner side: A |
| | Core material | — | — | — | 1.2 | — | — | — | — | — | — | — | — | — | — | | — | | | | |
| 18 | Filler metal | 12 | — | — | — | — | — | — | — | — | 0.2 | — | — | — | 0.05 | 0.4 | 9.6 | 3 | Nitrogen | Outer side: B | Outer side: B |
| | Sheet material | 10 | — | — | — | — | — | — | — | — | — | — | — | — | — | | 3.8 | | | Inner side: B | Inner side: B |
| | Core material | — | — | — | 1.2 | — | — | — | — | — | — | — | — | — | — | | — | | | | |
| 19 | Filler metal | 12 | — | — | — | — | — | — | — | — | 0.2 | — | — | — | 0.05 | 0.4 | 9.7 | 3 | Nitrogen | Outer side: B | Outer side: A |
| | Sheet material | 13 | — | — | — | 1.8 | — | — | — | — | — | — | — | — | — | | 3.5 | | | Inner side: A | Inner side: A |
| | Core material | — | — | — | 1.2 | — | — | — | — | — | — | — | — | — | — | | — | | | | |
| 20 | Filler metal | 12 | — | — | — | — | — | — | — | — | 0.1 | — | — | — | — | 0.4 | 9.8 | 12 | Nitrogen | Outer side: B | Outer side: A |
| | Sheet material | — | — | — | — | 0.4 | — | — | — | — | — | — | — | — | — | | 1.6 | | | Inner side: A | Inner side: A |
| | Core material | — | — | — | 1.2 | — | — | — | — | — | — | — | — | — | — | | — | | | | |
| 21 | Filler metal | 10 | — | — | — | — | — | — | — | — | 0.07 | — | 0.03 | — | — | 0.4 | 9.4 | 12 | Nitrogen | Outer side: B | Outer side: A |
| | Sheet material | — | — | — | — | 1.3 | — | — | — | — | — | — | — | — | — | | 6.3 | | | Inner side: A | Inner side: A |
| | Core material | — | — | — | 1.2 | — | — | — | — | — | — | — | — | — | — | | — | | | | |

Comparative Example 1

Aluminum alloys (i.e., an aluminum alloy for producing a filler metal, an aluminum alloy for producing a core material an aluminum alloy for producing a sheet material, and an aluminum alloy for producing a sacrificial anode material) respectively having the composition listed in Table 2 were subjected to continuous casting to obtain ingots. A soft clad sheet material (specimen) having a thickness of 0.4 mm was produced in the same manner as in Example 1, and a cup specimen was prepared using the specimen. Brazing was effected in a nitrogen gas furnace in the same manner as in Example 1, and the brazed state of the cup specimen was evaluated in the same manner as in Example 1. The evaluation results are shown in Table 2. In Table 2, the values that fall outside the scope of the invention are underlined. Note that a clad material that did not include a sheet material was also produced as a comparative specimen.

TABLE 2

| Specimen | Clad Configuration | Composition (mass %) Si | Fe | Cu | Mn | Mg | Cr | Zn | Ti | Zr | Li | Be | Ba | Ca | Bi | Thickness (mm) | Cladding Ratio (%) | Heating Time (450→600° C.) (min) | Atmosphere | Brazability of cup specimen Unetched | Etched |
|---|---|---|---|---|---|---|---|---|---|---|---|---|---|---|---|---|---|---|---|---|---|
| 22 | Filler metal | 10 | — | — | — | — | — | — | — | — | 0.02 | — | — | — | 0.05 | 0.4 | 10 | 12 | Nitrogen | Outer side: C Inner side: B | Outer side: C Inner side: A |
|  | Core material | — | — | — | — | — | — | — | — | — | — | — | — | — | — |  | — |  |  |  |  |
| 23 | Filler metal | 10 | — | — | 1.2 | — | — | — | — | — | 0.02 | — | — | — | 0.05 | 0.4 | 10 | 12 | Nitrogen | Outer side: C Inner side: C | Outer side: B Inner side: B |
|  | Core material | — | — | — | — | — | — | — | — | — | — | — | — | — | — |  | — |  |  |  |  |
| 24 | Filler metal | 10 | — | — | — | 0.6 | — | — | — | — | 0.02 | — | — | — | 0.05 | 0.4 | 9.8 | 12 | Nitrogen | Outer side: C Inner side: B | Outer side: B Inner side: A |
|  | Core material | — | — | — | 1.2 | — | — | — | — | — | — | — | — | — | — |  | — |  |  |  |  |
|  | Sacrificial anode material | — | — | — | — | 0.6 | — | 2.5 | — | — | — | — | — | — | — |  | 5.2 |  |  |  |  |
| 25 | Filler metal | <u>4</u> | — | — | — | — | — | — | — | — | 0.3 | — | — | — | — | 0.4 | 9.9 | 12 | Nitrogen | Outer side: D Inner side: C | Outer side: C Inner side: C |
|  | Sheet material | — | — | — | 1.2 | — | — | — | — | — | — | — | — | — | — |  | 0.8 |  |  |  |  |
|  | Core material | — | — | — | — | — | — | — | — | — | — | — | — | — | — |  | — |  |  |  |  |
| 26 | Filler metal | <u>16</u> | — | — | — | — | — | — | — | — | 0.2 | — | — | — | — | 0.4 | — | — | — | — | — |
|  | Sheet material | — | — | — | — | — | — | — | — | — | — | — | — | — | — |  | — |  |  |  |  |
|  | Core material | — | — | — | 1.2 | — | — | — | — | — | — | — | — | — | — |  | — |  |  |  |  |
| 27 | Filler metal | 12 | — | — | — | — | — | — | — | — | <u>0.03</u> | — | — | — | — | 0.4 | 9.4 | 12 | Nitrogen | Outer side: C Inner side: B | Outer side: C Inner side: B |
|  | Sheet material | — | — | — | — | — | — | — | — | — | — | — | — | — | — |  | — |  |  |  |  |
|  | Core material | — | — | — | 1.2 | — | — | — | — | — | — | — | — | — | — |  | 6.3 |  |  |  |  |
| 28 | Filler metal | 12 | — | — | — | — | — | — | — | — | — | <u>0.03</u> | — | — | — | 0.4 | 9.4 | 12 | Nitrogen | Outer side: C Inner side: B | Outer side: C Inner side: A |
|  | Sheet material | — | — | — | — | — | — | — | — | — | — | — | — | — | — |  | — |  |  |  |  |
|  | Core material | — | — | — | 1.2 | — | — | — | — | — | — | — | — | — | — |  | 6.3 |  |  |  |  |
| 29 | Filler metal | 12 | — | — | — | — | — | — | — | — | — | — | — | — | — | 0.4 | 9.4 | 12 | Nitrogen | Outer side: C Inner side: C | Outer side: C Inner side: B |
|  | Sheet material | — | — | — | — | — | — | — | — | — | — | — | — | — | — |  | — |  |  |  |  |
|  | Core material | — | — | — | 1.2 | — | — | — | — | — | — | — | — | — | — |  | 6.3 |  |  |  |  |
| 30 | Filler metal | 12 | — | — | — | — | — | — | — | — | — | — | — | <u>0.03</u> | — | 0.4 | 9.4 | 12 | Nitrogen | Outer side: C Inner side: C | Outer side: C Inner side: B |
|  | Sheet material | — | — | — | — | — | — | — | — | — | — | — | — | — | — |  | — |  |  |  |  |
|  | Core material | — | — | — | 1.2 | — | — | — | — | — | — | — | — | — | — |  | 6.3 |  |  |  |  |
| 31 | Filler metal | 10 | — | — | — | — | — | — | — | — | 0.2 | — | — | — | <u>0.3</u> | 0.4 | 9.8 | 12 | Nitrogen | Outer side: C Inner side: C | Outer side: C Inner side: C |
|  | Sheet material | — | — | — | — | — | — | — | — | — | — | — | — | — | — |  | — |  |  |  |  |
|  | Core material | — | — | — | 1.2 | — | — | — | — | — | — | — | — | — | — |  | 1.6 |  |  |  |  |
| 32 | Filler metal | 10 | — | — | — | — | — | — | — | — | 0.1 | — | — | — | 0.05 | 0.4 | — | — | — | — | — |
|  | Sheet material | — | — | — | — | — | — | — | — | — | — | — | — | — | — |  | — |  |  |  |  |
|  | Core material | — | — | — | 1.2 | — | — | — | — | — | — | — | — | — | — |  | — |  |  |  |  |
|  | Sacrificial anode material | — | — | — | — | — | — | 8 | — | — | — | — | — | — | — |  | 4.6 |  |  |  |  |
| 33 | Filler metal | 12 | — | — | — | <u>0.2</u> | — | — | — | — | <u>0.03</u> | — | — | — | — | 0.4 | 8.8 | 12 | Nitrogen | Outer side: C Inner side: C | Outer side: C Inner side: C |
|  | Sheet material | — | — | — | 1.2 | — | — | — | — | — | — | — | — | — | — |  | <u>11.8</u> |  |  |  |  |
|  | Core material | — | — | — | — | — | — | — | — | — | — | — | — | — | — |  | — |  |  |  |  |
| 34 | Filler metal | 10 | — | — | — | — | — | — | — | — | — | — | — | — | — | 0.4 | — | — | — | — | — |
|  | Sheet material | — | — | — | — | <u>6</u> | — | — | — | — | — | — | — | — | — |  | — |  |  |  |  |
|  | Core material | — | — | — | 1.2 | — | — | — | — | — | 0.05 | — | — | — | — |  | — |  |  |  |  |
| 35 | Filler metal | 12 | — | — | — | — | — | — | — | — | 0.03 | — | — | — | — | 0.4 | 9.6 | 12 | Nitrogen | Outer side: C Inner side: B | Outer side: C Inner side: B |
|  | Sheet material | 1.5 | — | — | — | — | — | — | — | — | — | — | — | — | — |  | — |  |  |  |  |
|  | Core material | — | — | — | 1.2 | — | — | — | — | — | — | — | — | — | — |  | 6.3 |  |  |  |  |

TABLE 2-continued

| | Clad | Composition (mass %) | | | | | | | | | | | | | | | Thickness (mm) | Cladding Ratio (%) | Heating Time (450→600° C.) (min) | Brazability of cup specimen | | | Etched |
|---|---|---|---|---|---|---|---|---|---|---|---|---|---|---|---|---|---|---|---|---|---|---|---|
| Specimen | Configuration | Si | Fe | Cu | Mn | Mg | Cr | Zn | Ti | Zr | Li | Be | Ba | Ca | Bi | | | | Atmosphere | Unetched | | |
| 36 | Filler metal | 12 | — | — | — | — | — | — | — | — | — | — | — | — | — | 0.4 | — | — | — | — | — | — |
| | Sheet material | 15 | — | — | — | — | — | — | — | — | 0.03 | — | — | — | — | | | | | | | |
| | Core material | — | — | — | 1.2 | — | — | — | — | — | — | — | — | — | — | | — | | | | | |
| 37 | Filler metal | 10 | — | — | — | — | — | — | — | — | — | — | — | — | — | 0.4 | 9.4 | 12 | Nitrogen | Outer side: C | | Outer side: B |
| | Sheet material | — | — | — | 1.2 | — | — | — | — | — | 0.03 | — | — | — | — | | 6.3 | | | Inner side: B | | Inner side: B |
| | Core material | — | — | — | — | — | — | — | — | — | — | — | — | — | — | | — | | | | | |
| 38 | Filler metal | 10 | — | — | — | — | — | — | — | — | — | — | — | — | — | 0.4 | 9.8 | 12 | Nitrogen | Outer side: C | | Outer side: B |
| | Sheet material | — | — | — | — | — | — | — | — | — | 0.07 | — | — | — | — | | 1.6 | | | Inner side: B | | Inner side: B |
| | Core material | — | — | — | 1.2 | 1.6 | — | — | — | — | — | — | — | — | — | | — | | | | | |

As shown in Table 2, the cup specimens prepared using Specimens 22 to 24 that did not include a sheet material had an inferior outer-side brazed state. The cup specimen prepared using Specimen 25 having a low Si content, had an inferior inner-side brazed state and an inferior outer-side brazed state since the amount of molten filler metal was insufficient. Cracks occurred during rolling when preparing Specimen 26 since the Si content in the filler metal was high. Specimens 27 to 30 had a problem in that the function of breaking the oxide film formed on the surface of the filler metal was insufficient since the content of Li, Be, Ba, or Ca in the sheet material was low, and had inferior brazability. Specimen 31 had a problem in that the Bi content in the filler metal was high, and a Bi oxide was formed, and had inferior brazability.

Cracks occurred during rolling when preparing Specimen 32 since the Zn content in the sacrificial anode material was high. Specimen 33 had a problem in that the function of breaking the oxide film formed on the surface of the filler metal was insufficient since the content of Mg and Li in the sheet material was low, and had inferior brazability. Specimen 34 had a problem in that separation occurred at the interface between the sheet material and the filler metal during clad rolling since the Mg content in the sheet material was high. Specimen 35 did not show an improvement in brazed state with respect to Specimen 27 since the Si content in the sheet material was low. Cracks occurred during rolling when preparing Specimen 36 since the Si content in the sheet material was high. Specimen 37 had a problem in that the function of breaking the oxide film formed on the surface of the filler metal was insufficient since the Mg content in the core material and the Li content in the sheet material were low, and had inferior brazability. Specimen 38 had a problem in that the melting point of the core material decreased, and the core material was eroded by the molten filler metal since the Mg content in the core material was high, and was deformed during brazing.

Example 2

Aluminum alloys (i.e., an aluminum alloy for producing a filler metal, an aluminum alloy for producing a core material an aluminum alloy for producing a sheet material, and an aluminum alloy for producing a sacrificial anode material) respectively having the composition listed in Table 3 were subjected to continuous casting to obtain ingots. A soft clad sheet material (specimen) having a thickness of 0.4 mm was produced in the same manner as in Example 1. The specimen was pressed in the shape of a cup, degreased using acetone ("Unetched" in Table 3), or degreased using acetone, and etched using a weak acid ("Etched" in Table 3), and a fin obtained by forming and degreasing a 3003 alloy sheet material having a thickness of 0.1 mm was provided inside the specimen to prepare a cup specimen illustrated in FIG. 1. A flux (fluoride flux basically including KF and $AlF_3$) that was diluted with an alcohol was applied to the outer side of the flare joint of the cup specimen (indicated by the arrow in FIG. 2), and the cup specimen was brazed in a nitrogen gas furnace under the same conditions as those employed in Example 1. The brazed state of the cup specimen was evaluated in the same manner as in Example 1. The weight of the specimen was measured after drying using an electronic balance, and the difference between the weight of the specimen measured after drying and the weight of the specimen measured before applying the flux was taken as the amount of the flux applied. The evaluation results are shown in Table 3.

TABLE 3

| Specimen | Clad Configuration | Composition (mass %) | | | | | | | | | | | | | | Thickness (mm) | Cladding Ratio (%) |
|---|---|---|---|---|---|---|---|---|---|---|---|---|---|---|---|---|---|
| | | Si | Fe | Cu | Mn | Mg | Cr | Zn | Ti | Zr | Li | Be | Ba | Ca | Bi | | |
| 39 | Filler metal | 10 | — | — | — | — | — | — | — | — | — | — | — | — | 0.05 | 0.4 | 9.6 |
| | Sheet material | — | — | — | — | — | — | — | — | — | 0.08 | — | — | — | — | | 3.8 |
| | Core material | — | — | — | 1.2 | — | — | — | — | — | — | — | — | — | — | | — |
| 40 | Filler metal | 10 | — | — | — | — | — | — | — | — | — | — | — | — | 0.05 | 0.4 | 9.4 |
| | Sheet material | — | — | — | — | — | — | — | — | — | — | 0.05 | — | — | — | | 6.3 |
| | Core material | — | — | — | 1.2 | — | — | — | — | — | — | — | — | — | — | | — |
| 41 | Filler metal | 10 | — | — | — | — | — | — | — | — | — | — | — | — | 0.05 | 0.4 | 9.7 |
| | Sheet material | — | — | — | — | — | — | — | — | — | — | — | 0.1 | — | — | | 3.2 |
| | Core material | — | — | — | 1.2 | — | — | — | — | — | — | — | — | — | — | | — |
| 42 | Filler metal | 10 | — | — | — | — | — | — | — | — | — | — | — | — | 0.05 | 0.4 | 9.4 |
| | Sheet material | — | — | — | — | — | — | — | — | — | — | — | — | 0.07 | — | | 6.3 |
| | Core material | — | — | — | 1.2 | — | — | — | — | — | — | — | — | — | — | | — |
| 43 | Filler metal | 10 | — | — | — | — | — | — | — | — | — | — | — | — | 0.05 | 0.4 | 9.2 |
| | Sheet material | — | — | — | — | — | — | — | — | — | 0.1 | — | — | — | — | | 3.1 |
| | Core material | — | — | — | 1.2 | — | — | — | — | — | — | — | — | — | — | | — |
| | Sacrificial anode material | — | — | — | — | — | — | 2.5 | — | — | — | — | — | — | — | | 4.6 |

| Specimen | Clad Configuration | Heating Time (450→600° C.) (min) | Atmos. | Brazability of cup specimen | | | |
|---|---|---|---|---|---|---|---|
| | | | | Unetched | | Etched | |
| | | | | Appl of Flux | | Appl of Flux | |
| 39 | Filler metal Sheet material Core material | 12 | Nitrogen | Not applied Outer side: B Inner side: A | Applied 1 g/m² Outer side: A Inner side: A | Not applied Outer side: A Inner side: A | Applied 1 g/m² Outer side: A Inner side: A |

TABLE 3-continued

| 40 | Filler metal | 12 | Nitrogen | Outer side: B | 2 g/m² | Outer side: A | 1 g/m² |
| | Sheet material | | | Inner side: A | Outer side: A | Inner side: A | Outer side: A |
| | Core material | | | | Inner side: A | | Inner side: A |
| 41 | Filler metal | 12 | Nitrogen | Outer side: B | 20 g/m² | Outer side: B | 10 g/m² |
| | Sheet material | | | Inner side: B | Outer side: A | Inner side: B | Outer side: A |
| | Core material | | | | Inner side: B | | Inner side: B |
| 42 | Filler metal | 12 | Nitrogen | Outer side: B | 5 g/m² | Outer side: B | 5 g/m² |
| | Sheet material | | | Inner side: B | Outer side: A | Inner side: B | Outer side: A |
| | Core material | | | | Inner side: B | | Inner side: B |
| 43 | Filler metal | 12 | Nitrogen | Outer side: B | 3 g/m² | Outer side: A | 3 g/m² |
| | Sheet material | | | Inner side: A | Outer side: A | Inner side: A | Outer side: A |
| | Core material | | | | Inner side: A | | Inner side: A |
| | Sacrificial anode material | | | | | | |

As shown Table 3, the cup specimens prepared using Specimens 39 to 43 according to the invention had an excellent (acceptable) brazed state. Specimens 39 to 43 were prepared using the sheet material including Li, Be, Ba, or Ca. The brazability of the outer side of the cup specimen was improved in a stable manner by applying a small amount of flux when the sheet material including Li, Be, Ba, or Ca was interposed between the core material and the filler metal.

Comparative Example 2

Aluminum alloys (i.e., an aluminum alloy for producing a filler metal, an aluminum alloy for producing a core material, an aluminum alloy for producing a sheet material, and an aluminum alloy for producing a sacrificial anode material) respectively having the composition listed in Table 4 were subjected to continuous casting to obtain ingots. A soft clad sheet material (specimen) having a thickness of 0.4 mm was produced in the same manner as in Example 1, and a cup specimen was prepared in the same manner as in Example 2 using the specimen. A flux (fluoride flux basically including KF and AlF₃) that was diluted with an alcohol was applied to the outer side of the flare joint of the cup specimen (indicated by the arrow in FIG. 2), and the cup specimen was brazed in a nitrogen gas furnace under the same conditions as those employed in Example 1. The brazed state of the cup specimen was evaluated in the same manner as in Example 1. The evaluation results are shown in Table 4.

TABLE 4

| Specimen | Clad Configuration | Composition (mass %) | | | | | | | | | | | | | Thickness (mm) | Cladding Ratio (%) |
| | | Si | Fe | Cu | Mn | Mg | Cr | Zn | Ti | Zr | Li | Be | Ba | Ca | Bi | | |
|---|---|---|---|---|---|---|---|---|---|---|---|---|---|---|---|---|---|
| 44 | Filler metal | 10 | — | — | — | — | — | — | — | — | — | — | — | — | 0.05 | 0.4 | 9.6 |
| | Sheet material | — | — | — | — | — | — | — | — | — | 0.08 | — | — | — | — | | 3.8 |
| | Core material | — | — | — | 1.2 | — | — | — | — | — | — | — | — | — | — | | — |
| 45 | Filler metal | 10 | — | — | — | — | — | — | — | — | — | — | — | — | 0.05 | 0.4 | 9.6 |
| | Sheet material | — | — | — | — | — | — | — | — | — | 0.08 | — | — | — | — | | 3.8 |
| | Core material | — | — | — | 1.2 | — | — | — | — | — | — | — | — | — | — | | — |
| 46 | Filler metal | 10 | — | — | — | — | — | — | — | — | — | — | — | — | — | 0.4 | 9.9 |
| | Sheet material | — | — | — | — | 7 | — | — | — | — | 0.05 | — | — | — | — | | 0.8 |
| | Core material | — | — | — | 1.2 | — | — | — | — | — | — | — | — | — | — | | — |

| Specimen | Clad Configuration | Heating Time (450→600° C.) (min) | Atmos. | Brazability of cup specimen | | | |
| | | | | Unetched | | Etched | |
| | | | | Appl of Flux | | Appl of Flux | |
| | | | | Not applied | Applied | Not applied | Applied |
|---|---|---|---|---|---|---|---|
| 44 | Filler metal | 12 | Nitrogen | Outer side: B | 0.7 g/m² | Outer side: A | 0.7 g/m² |
| | Sheet material | | | Inner side: A | Outer side: B | Inner side: A | Outer side: A |
| | Core material | | | | Inner side: A | | Inner side: A |
| 45 | Filler metal | 12 | Nitrogen | Outer side: B | 30 g/m² | Outer side: A | 30 g/m² |
| | Sheet material | | | Inner side: A | Outer side: D | Inner side: A | Outer side: D |
| | Core material | | | | Inner side: A | | Inner side: A |
| 46 | Filler metal | 12 | Nitrogen | Outer side: B | 3 g/m² | Outer side: A | 10 g/m² |
| | Sheet material | | | Inner side: A | Outer side: C | Inner side: A | Outer side: B |
| | Core material | | | | Inner side: A | | Inner side: A |

As shown in Table 4, the cup specimen prepared using Specimen 44 had an acceptable brazed state. However, since the amount of flux applied was small, an improvement in brazability due to application of the flux was not observed with respect to the cup specimen prepared using Specimen 39 (see Table 3) to which an appropriate amount of flux was applied. The cup specimen prepared using Specimen 45 had a problem in that a large amount of flux residue was observed after brazing since the amount of flux applied was large. Specimen 46 had a problem in that, since the Mg content in the sheet material was high, Mg that was diffused from the sheet material into the surface of the filler metal during brazing reacted with the flux, and the function of the flux deteriorated. Moreover, a solid compound was produced, and brazability was impaired.

The invention claimed is:

1. An aluminum alloy brazing sheet comprising a core material and a filler metal, and being used to braze aluminum in an inert gas atmosphere or m vacuum, the core material comprising aluminum or an aluminum alloy, the filler metal comprising 6 to 13 mass % of Si, with the balance being Al and unavoidable impurities, and one side or each side of the core material being clad with the filler metal, wherein the core material is clad with the tiller metal in a state in which a sheet material is interposed between the core material and the filler metal, the sheet material comprising one element, or two or more elements, among 0.05 mass % or more of Li, 0.05 mass % or more of Be, 0.05 % or more of Ba, and 0.05mass % or more of Ca, with the balance being Al and unavoidable impurities.

2. The aluminum alloy brazing sheet according to claim 1, wherein the sheet material further comprises 0.4 to 4.0 mass % of Mg.

3. The aluminum alloy brazing sheet according to claim 1, wherein the sheet material further comprises 2 to 13 mass % of Si.

4. The aluminum alloy brazing sheet according to claim 1, wherein the filler metal further comprises 0.004 to 0.2 mass % of Bi.

5. The aluminum alloy brazing sheet according to claim 1, wherein the core material that comprises the aluminum alloy comprises one element, or two or more elements, among 1.8 mass % or less of Mn, 1.2 mass % or less of Si, 1.0 mass % or less of Fe, 1.5 mass % or less of Cu, 0.8 mass % or less of Zn, 0.2 mass % or less of Ti, and 0.5 mass % or less of Zr, with the balance being Al and unavoidable impurities.

6. The aluminum alloy brazing sheet according to claim 5, wherein the core material that comprises the aluminum alloy further comprises 0.4 to 1.3 mass % of Mg.

7. A brazing method comprising effecting brazing in an inert gas atmosphere or in vacuum using the aluminum alloy brazing sheet according to claim 1 without applying a flux.

8. A brazing method comprising effecting brazing in an inert gas atmosphere using the aluminum alloy brazing sheet according to claim 1 in a state in which a fluoride-based flux is applied to the entirety or part of a brazing area in an amount of 1 to 20 g/m$^2$.

* * * * *